Oct. 19, 1943.  T. JENSEN  2,332,084
BREAD SLICER
Filed Dec. 31, 1940
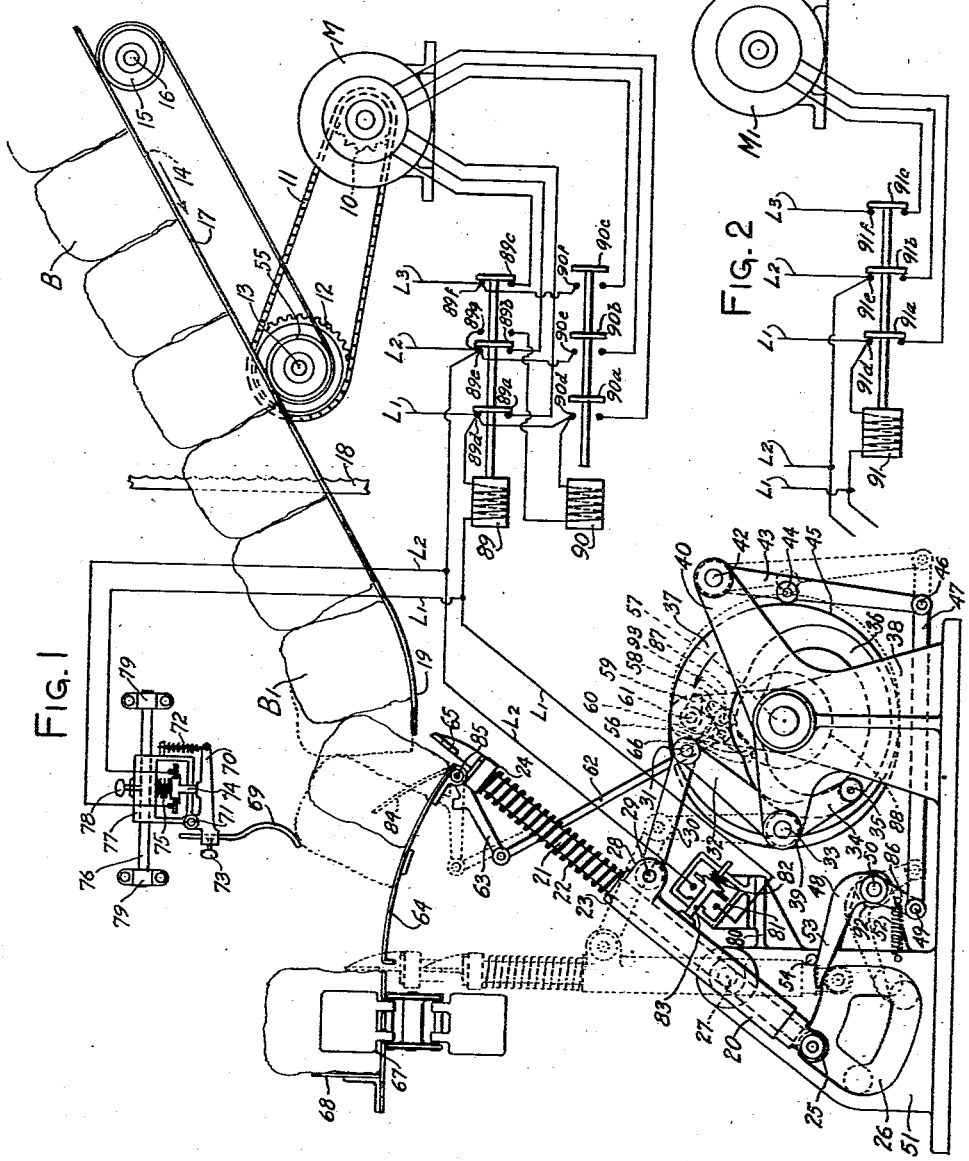
INVENTOR
THORMOD JENSEN
BY Georges S. Hastings
ATTORNEY Patented Oct. 19, 1943

2,332,084

UNITED STATES PATENT OFFICE 2,332,084

BREAD SLICER

Thormod Jensen, Laurelton, N. Y., assignor to American Machine & Foundry Company, a corporation Application December 31, 1940, Serial No. 372,443

17 Claims. (Cl. 93—2)

The present invention relates to improvements in a slicing and wrapping assembly, and more particularly to the provision of means by which the operation of the slicing mechanism is so coordinated with that of the wrapping mechanism as to assure the uniform delivery to the wrapping mechanism of a stream of sliced articles responding accurately to the demand of the wrapping mechanism.

When a bread slicing machine is connected to a wrapping machine, some provision has to be made for feeding a sufficient number of loaves through a slicing machine to the wrapping machine to keep the latter adequately supplied at all times. Provision also has to be made for preventing a larger number of loaves from being fed to the wrapping machine than can be taken up by the feeding flights of the wrapping machine.

It is an object of the present invention to provide an improved and simplified device for operating the feeding means of a slicing machine in synchronized relation with the feeding flights of a wrapping machine.

A further object is to provide an improved and simplified transfer mechanism operating between the slicing knives and the feeding flights of a wrapping machine, which will hold the sliced loaves of bread intact while being transferred and which will not pinch the loaf in withdrawing after completing the transfer.

Another object is to reduce or increase the number of sliced loaves of bread forwarded toward the wrapping machine by regulating the speed at which the motor driving the slicing machine operates.

Another object is to use a multispeed motor in conjunction with a slicing machine for regulating the speed at which sliced loaves of bread are fed to a wrapping machine, so as to avoid underfeeding and overfeeding and to correct the same automatically should any occur, by having the motor run at a higher or lower rate of speed.

Other objects and features of the invention will appear as the description of the particular physical embodiment selected to illustrate the invention progresses.

In the accompanying drawing, which forms a part of this specification, like characters of reference have been applied to corresponding parts throughout the several views which make up the drawing, in which:

Fig. 1 shows a side elevation of the bread slicer connected to a two-speed motor and also of the transfer mechanism for advancing sliced loaves of bread to the feeding flights of a wrapping machine; and Fig. 2 shows a schematic wiring diagram for connecting the bread slicer to a one-speed motor.

Referring to the drawing, the figure M represents a two-speed motor having a sprocket wheel 10 fixedly mounted to its shaft for rotation therewith. Revolving upon said sprocket wheel 10 is a sprocket chain 11 which also revolves over another sprocket wheel 12. The sprocket wheel 12 is fixedly mounted upon a shaft 13 to which is also fixed a pulley 55. Revolving over said pulley is a feed belt 14 which also revolves at its other end over a pulley 15 freely mounted upon the shaft 16. Loaves of unsliced bread B are placed upon an inclined feed plate 17 by an operator or from a conveyor system, and the under portion of said loaves of bread comes into contact with the upper portion of belt 14 which operates through a suitable opening formed in the inclined feed plate 17.

The unsliced loaves of bread are positively forwarded and fed through the slicing knives 18 by means of the feed belt 14. When the loaves of bread have been sliced, they are delivered to the delivery end 19 of a delivery plate. Located at the end of the delivery plate 19 is a transfer mechanism comprising a table 64 and a pusher plate 65. An oscillating guide sleeve 20 is mounted upon a shaft 27 which is secured to support 51. Slidably mounted in said guide sleeve 20 is a bar 21 which supports at its upper end a collar 24 and the pusher plate 65. Mounted on the lowed end of said bar 21 is a cam follower 25 which tracks within a closed cam track 26 formed in supporting bracket 51. A compression spring 22 is mounted around the bar 21 and operates against the upper part of guide sleeve 20 and against collar 24 formed on the upper part of bar 21 so that normally there is exerted upon the bar 21 an upward push.

A disk 37 having a circumferential cam track 45 on the outside and a closed cam track 36 on the inside is provided for imparting operating and oscillating motion to the pusher plate 65 by means of the cam followers 35, 44 operated by said cam tracks 36, 45. The disk 37 is freely mounted for rotation in the direction shown by the arrow upon a moving shaft 57 held in supporting bracket 38. Another cam track 88 having a notch 66 formed therein is also provided on disk 37 for the purpose of receiving driving motion from a pawl 56, 58, to be hereinafter described.

In order to impart oscillating motion to the guide sleeve 20, a link 30 is connected at one end to a lug 28 formed on the upper part of guide sleeve 20 by means of a pin 29. The other end of link 30 is connected to an arm 32 of a bell crank by means of a pin 31. The bell crank 32, 34 is pivotally mounted at its elbow upon a stud 33 secured to a supporting arm 39 of support 38. Operating motion is imparted to the bell crank by means of a cam roller 35 mounted at the end of arm 34. A link 43 is movably fixed at one end to a supporting arm 40 of bracket 38 by means of a stud 42, and has a cam follower 44 mounted thereon which tracks against the circumferential cam track 45 of disk 37. The other end of link 43 is connected to a second link 47 by means of a stud 46, which second link in turn is connected to an arm 86 of an operating bell crank lever 48 by means of another stud 49. The bell crank 48, when operated, connects with the cam roller 25 and pushes it downward so that it can track in the lower part of cam track 26 when returning the pusher plate 65 back to starting position. The operating bell crank is pivotally mounted upon a supporting bracket 92 formed on support 51 by means of a stud 50. A spring 52, connected at one end to an arm 86 of bell crank 48 and at the other end to support 51, is provided for normally holding the operating bell crank 48 against a stop pin 54.

The shaft 57 mounted in the supporting bracket 38 is connected to the driving mechanism of a wrapping machine and continuously rotates while the machine is in operation. A pawl 56, 58 is fixedly mounted on the rotating shaft 57 by means of a suitable support (not shown) which carries a pin 93 on which pawl 56, 58 pivots. The pawl 56, 58 continuously rotates with shaft 57 at all times when the latter is in operation.

A spring (not shown) tensioned between the pawl 56, 58 and the support which holds pin 93 is provided for holding the toe end 56 of the pawl against the cam track 88 of the disk 37. The cam track 88 has a notch 66 formed therein for receiving the toe end 56 of the pawl. Normally the toe end 56 of the pawl will slip into this notch 66 while rotating and thereby impart rotating movement to the disk 37 on which are formed the cam tracks 36 and 45. In order that the toe end 56 of the pawl may be quickly removed from the notch 66, a knockout lug 58 is formed on the other end of said pawl. When the knockout arm 59 of the bell crank 59, 60 is in operating position, it will knock out the pawl 56 from the notch 66 and permit the pawl 56 to rotate on the outside of cam track 88 for at least one revolution. When the pawl 56 rotates on the outside of the cam track 88, no operating motion is imparted to the cam disk 37 and hence the transfer mechanism 65 remains inoperative until such time as the pawl slips back into the notch 66.

A bell crank lever 59, 60 is pivotally mounted at its elbow by means of a stud 61 to a bracket 87 formed on support 38. One arm 60 of the bell crank 59, 60 is connected to a link 62 which in turn is connected to the arm 63 of a second bell crank 63, 84. The arm 84 of said bell crank forms a foot plate which is depressed into a corresponding slot formed in the table 64 to receive the arm 84 when a sliced loaf of bread is deposited thereon. A coil spring (not shown) or other suitable means wrapped around the stud 85 is provided for maintaining the pressure foot in a raised position unless depressed by some object resting thereon.

The sliced loaves of bread B' are pushed across the transfer table 64 by means of the pusher plate 65 to the feeding flights 67 of the wrapping machine. Suitable side guide plates for holding the sliced loaves of bread together have been omitted from the drawings for the sake of clarity, and in view of the fact that they do not form a part of the novel features of the present invention. A back guide plate 68 is provided for holding the sliced loaves of bread in place and guiding the same through the wrapping machine.

A feeler finger 69 located above the transfer table 64 forming one arm of a bell crank 69, 70 is adjustably mounted at the end of arm 70 by means of clamp screw 73. Bell crank 69, 70 is pivotally mounted upon a stud 71 fixed to a switch box 77. The switch box 77 is of standard construction where a spring such as 75 is used for normally keeping the circuit open unless some object is acting on the button 74 to close the circuit. A spring 72 which is stronger than the spring 75 is provided for holding the bell crank lever 70 against the switch button 74 to close the circuit. The switch box 77 is slidably mounted upon a bar 76 fixed to supporting brackets 79. A clamp screw 78 holds the switch box 77 stationary upon the slide bar 76.

Whenever a sliced loaf of bread B' passes over the transfer table 64, it will strike against the feeler arm 69 thereby momentarily opening the circuit passing through switch box 77. The circuit will also be opened when sliced loaves of bread have been overfed to such an extent as to contact the feeler finger 69, such overfeed being shown by the dotted outline of sliced loaves of bread on the transfer table 64.

Another switch box 81 is mounted upon a bracket 80 formed on the support 51. The switch 81 is of standard construction and is provided with a spring 82 which normally keeps the circuit closed. The switch is so mounted that the button 83 thereon comes into contact with the guide sleeve 20 so as to open the circuit when the pusher plate 65 is in its back position, as shown in Fig. 1.

In Fig. 1 there is illustrated a wiring diagram of an electrical control for the two-speed motor M which is depicted therein as of the three-phase alternating current induction type. It should be understood that alternating current motors of different phase and/or type, or direct current motors of suitable type, may also be used. This controller permits the motor to be driven at either high speed or at low speed, depending upon what position the transfer arm is in and also upon how far the sliced loaves have been overfed.

The motor M may be of the single winding, two-speed, consequent pole design; or it may be of the two-winding, two-speed design. The motor M is connected to the feed lines L1, L2 and L3 which conduct current of the required phase frequency.

Fig. 2 discloses how a one-speed motor might be used rather than a two-speed motor to accomplish the results obtained by means of a two-speed motor in slowing down the feed conveyor of a slicing machine, where loaves are being sliced more rapidly than can be handled at the moment by the wrapping machine to which it is connected.

The operation of the machine may be briefly described as follows:

The bread B is placed upon the inclined feed plate 17 and is forwarded by means of the conveyor belt 14 to the slicing knives 18 and is pushed down through the slicing knives onto the delivery plate 19 by the succeeding loaves of bread which are positively fed by the belt 14. The normal speed of belt 14 is so fixed that there will be a slight overfeed when slicing articles which vary slightly in size such as loaves of bread. Where the objects to be sliced do not vary in size, the normal speed of belt 14 may be fixed to operate in timed relation with a wrapping machine. The sliced loaves of bread B' are then delivered to the transfer table 64 from the delivery plate 19. It is understood that common suitable side guide plates are provided for holding the sliced loaves of bread together and have been omitted from the present drawings for the purpose of clarity and simplification.

In dropping to the delivery table 64 the sliced loaves of bread by their own weight depress the foot plate 84 which forms one arm of a bell crank 63, 84. The other arm 63 of said bell crank, by means of a connecting link 63, depresses the arm 60 of a second bell crank 59, 60, as shown in Fig. 1, so as to raise the knockout arm 59 out of operating position. The toe end 56 of the pawl riding on the outside of cam track 88 is then permitted to slide into the notch 66 of cam track 88. The pawl 56, by reason of its fixed connection to the rotating shaft 55 which is connected to the wrapping machine, rotates the disk 37 in the direction indicated by the arrow. The rotating disk 37 by means of its closed cam track 36 oscillates the bell crank 32, 34 so as to forward the pusher plate 65 in the direction of the feeding flights 67 of the wrapping machine. The pusher plate 65 operates above and through a suitable slot (not shown) formed in the transfer table 64. When the pusher plate 65 has moved to its forward position, as shown in dotted lines in Fig. 1, the bell crank 32, 34 momentarily ceases to operate and the circumferential cam track 45 then operates against the cam roller 44 so as to push it outward, as shown in dotted lines in Fig. 1. The bell crank 53, 86 is thereby operated so as to connect with the cam roller 25 to depress the same, and in so doing compresses the spring 22. When the pusher plate 65 is in said lower position, the bell crank 32, 34 is again operated by means of the cam track 36 so as to pull the pusher plate 65 back into its starting position, the same being withdrawn beneath the transfer table 64. The pusher plate 65 is held in its lower position by means of the cam roller 25 following in the lower portion of the cam track 26. When the pusher plate has returned to its forward position again, it snaps upward once it is clear of the retaining action of the lower portion of cam track 26 under the upward pressure of the compression spring 22.

If in the meantime another sliced loaf of bread B' has been deposited upon the foot plate 84 so as to depress the same, the knockout arm 59 will continue to remain in inoperative position, thereby allowing the pawl 56 to rotate the disk 37 for another revolution, again forwarding a sliced loaf of bread to the feeding flights of the wrapping machine, as has just been described.

On the other hand, should a sliced loaf of bread not have been deposited upon the feed plate 84, the latter under action of a compression spring (not shown) would rise and thereby would pull the knockout arm 59 into operating position. The knockout arm 59 would then connect with the knockout lug 58 of the pawl so as to push the toe end 56 of the pawl out of contact with the notch 66. The toe end 56 of the pawl would then ride against the outside portion of the cam track 88 for one revolution without rotating the disk 37, and the disk 37 would not therefore impart operative motion to the pusher plate 65 and the same would remain stationary. This inoperative state will continue to exist as long as no sliced loaf of bread is deposited upon the foot plate 84.

When the electrical circuit is closed by either the feeler finger switch mechanism 77, or by the oscillating sleeve operated switch 81, or by both, the relay 89 will be energized so as to pull the contact plates 89a, 89b and 89c into connection with contacts 89d, 89e and 89f in order to operate the two-speed motor M at high speed.

It will be noted that the circuit passing through the switch mechanism 81 is closed so as to energize the relay 89 for operating the two-speed motor M at high speed when the pusher plate is transferring a loaf of bread to the feeding flights 67 of the wrapping machine. The circuit passing through the feeler finger switch mechanism 77 will normally be closed unless the same should be opened by means of a sliced loaf of bread coming in contact with the feeler finger 69. The circuit passing through the feeler finger switch 77 will be opened momentarily whenever a sliced loaf of bread is transferred across the transfer table 64, and it will also be opened when there is an overfeed of sliced loaves of bread upon the transfer table 64.

When the circuit passing through the feeler finger switch 77 is broken and the circuit passing through the oscillating sleeve operated switch 81 is broken at the same time so that both circuits are open, the relay 89 will be de-energized. The contact plates 89a, 89b and 89c will then withdraw from the contacts 89d, 89e and 89f, and the contact plate 89b will connect with the back contact 89g so as to energize the relay 90. The contact plates 90a, 90b and 90c will then come into action with the contacts 90d, 90e and 90f so as to operate the two-speed motor M at low speed. By operating the motor at low speed, the unsliced loaves of bread are not fed so quickly through the slicing knives and overfeed of sliced loaves of bread will thereby be corrected in one or more cycles of the transfer mechanism, depending upon how long it takes to diminish the overfeeding.

When one or both of the circuits passing through the feeler finger switch mechanism 77 and the oscillating sleeve operated switch 81 is closed, the relay 89 will be energized and the relay 90 will be de-energized and the two-speed motor will again be operated at high speed in the manner just described. It will therefore be noted that when more sliced loaves are being forwarded to the transfer table 64 than can be handled at the moment by the wrapping machine mechanism to which the slicing unit is connected, the feeding mechanism of the slicing machine will be slowed down sufficiently to correct the overfeed.

Where a single speed motor M' is used for feeding loaves of bread through a slicing machine, the same results can be obtained as where a two-speed motor is used by connecting the motor M' in the manner disclosed in Fig. 2. It will be seen that when the circuit passing through the feeler finger switch mechanism 77 is closed, or the circuit passing through the oscillating sleeve operated switch 81 is closed, or both are closed, the relay 91 will be energized and the contact plates 91a, 91b and 91c will then be pulled forward so as to connect with contacts 91d, 91e and 91f, thereby operating the single speed motor M'. When the circuit passing through the feeler finger switch mechanism 77 is broken, and the circuit passing through the oscillating sleeve operated switch 81 is also broken at the same time, the relay 91 will be de-energized, and the contact plates 91a, 91b and 91c will withdraw from the contacts 91d, 91e and 91f, and the current operating the single speed motor M' will be disconnected. The motor M' will then start to slow down in order to come to a stop. This slowing down and stopping motion will have the same effect as operating a two-speed motor at low speed, and any overfeed of sliced loaves of bread in excess of the amount which can be handled at the moment by the wrapping machine will be corrected in the manner just described.

In view of the fact that a wrapping machine and a slicing machine operate quite rapidly, the single speed motor M' may never actually come to a dead stop but will only be able to slow down. Whether or not the single speed motor M' comes to a stop depends upon the amount of friction involved. For the sake of simplicity, the motors shown in the present disclosure are connected to an alternating current system. Direct current motors might be substituted, if desired.

The invention above described may be varied in construction within the scope of the claims, for the particular device selected to illustrate the invention is but one of many concrete embodiments of the same. The invention therefore is not to be restricted to the precise details of the structure shown and described.

What is claimed is:

1. The combination with a slicing machine, comprising a table, slicing knives, a feed conveyor associated with said table for advancing articles to be sliced toward said knives, of a transfer device disposed between said slicing knives and a wrapping machine for transferring sliced articles from the former to the latter, an electric motor capable of being run at different speeds for operating said feed conveyor, and means associated with said slicing and wrapping machines for increasing and decreasing the speed of said electric motor in order to feed a desired number of sliced articles to the wrapping machine which the latter is capable of handling.

2. The combination with a slicing machine, comprising a table, slicing knives, a feed conveyor associated with said table for advancing articles to be sliced toward said knives, of a transfer device disposed between said slicing knives and a wrapping machine for transferring sliced articles from the former to the latter, an electric motor for operating said feed conveyor, and a switch actuated by the sliced articles and by the transfer mechanism for starting and stopping said motor in order to feed a desired number of sliced articles to the wrapping machine.

3. The combination with a slicing machine having conveying mechanism, slicing knives, a multispeed electric motor for operating said conveying mechanism, of a transfer device for transferring sliced articles from the slicing machine to a wrapping machine, and means actuated by the transfer mechanism and by the sliced articles for causing said motor to be driven at different speeds in order to feed the wrapping machine the largest number of sliced articles it is capable of handling.

4. The combination with a slicing machine having a support for articles to be sliced, slicing knives, a feeding device for forwarding articles to be sliced toward said slicing knives, a single speed electric motor for driving said feeding device, of a transfer mechanism for transferring sliced articles from the slicing machine to a wrapping machine, and a switch actuated by an overfeed of sliced articles for governing the operation of said motor so as to reduce temporarily the number of sliced articles fed to the wrapping machine by shutting off the electric power operating said motor.

5. A slicing machine, in combination with a transfer mechanism comprising a support, a pusher arm, means for oscillating said pusher arm, means for maintaining a portion of said pusher arm above said support when transferring an article, means for lowering said pusher arm so as to permit the pusher arm to be withdrawn beneath said support, a motor operating mechanism for advancing articles through said slicing machine, and means for regulating the operation of said motor so as to diminish the number of articles fed through the slicing machine when more articles are being advanced than are being taken away by the transfer mechanism.

6. The combination with a bread slicing machine having a support, slicing knives mounted across said support for slicing articles forwarded thereon, feeding mechanism cooperating with said support for forwarding loaves of bread through said slicing knives, an electric motor for driving said feeding mechanism, of sliced loaf transfer mechanism adjacent to said slicing machine for receiving sliced loaves of bread and transferring the same to the intake area of a wrapping machine, and means associated with the output side of the slicing machine which is actuated when an overfeed takes place for changing the speed at which said electric motor drives the slicing machine feeding mechanism.

7. The combination with a slicing machine, of a transfer mechanism comprising, a support, an arm having a pusher plate mounted on the end thereof, means for oscillating said arm, and mechanism for operating said pusher plate to move it in a closed path to and from starting position; said mechanism including means for holding said pusher plate above the support when transferring an article, means for lowering said pusher plate below the support in a substantially vertical path parallel to the face of the loaf engaged by the pusher to thereby avoid pinching the loaf, and means to permit the plate to be returned below the support to starting position.

8. In a loaf feed control of the class described, in which an inbound conveying mechanism forwards loaves of bread to be sliced over a runway to and through a bread slicing unit from whence the sliced loaves are picked up by an outbound conveyor mechanism, normally actuated in time with a wrapping machine and to which it delivers the sliced loaves of bread for wrapping; a multispeed electric motor driving said inbound conveying mechanism at different speeds; an electric circuit in multiple which energizes, when closed, a relay for operating said motor at one speed and when the circuit is open de-energizes said relay and thereby permits a second relay to be energized so as to operate said motor at another speed; switch mechanism positioned at the outbound side of the conveyor mechanism, and actuated by an overfeed for causing said relays to be energized and de-energized in order to operate said inbound conveying mechanism at different speeds.

9. In a loaf feed control of the class described, in which an infeed mechanism forwards loaves of bread to be sliced to and through a bread slicing unit, an outbound transfer mechanism disposed on the opposite side of said slicing unit and normally actuated in time with a wrapping mechanism for transferring sliced loaves from the slicing unit to the wrapping mechanism; an electric motor for driving said infeed conveyor; an electric control circuit including means for driving said motor at one speed when said circuit is closed and for driving said motor at another speed when said circuit is open; and means disposed at the outbound side of the slicing unit for opening and closing said circuit in order to coordinate the number of loaves sliced with the number of loaves taken away by the outbound transfer mechanism to the wrapping machine.

10. In a loaf feed control of the class described, in which an infeed mechanism forwards loaves of breads to be sliced to and through a bread slicing unit, an outbound transfer mechanism disposed on the opposite side of said slicing unit and normally actuated in time with a wrapping mechanism for transferring sliced loaves from the slicing unit to the wrapping mechanism; a multispeed electric motor for driving said conveyor at different speeds; an electrical control circuit including means for driving said motor at one speed when said circuit is closed and for driving said motor at another speed when said circuit is open; and means disposed on the outbound side of the slicing unit for opening and closing said circuit in order to coordinate the number of loaves sliced with the number of loaves taken away by the outbound transfer mechanism to the wrapping machine.

11. In a loaf feed control of the class described, in which an infeed mechanism forwards loaves of bread to be sliced to and through a bread slicing unit, an outbound transfer mechanism disposed on the opposite side of said slicing unit and normally actuated in time with a wrapping mechanism for transferring sliced loaves from the slicing unit to the wrapping mechanism; an electric motor capable of being operated at a plurality of different speeds for driving said infeed conveyor; a control device for normally operating said motor at one speed and for operating said motor at a slower speed when loaves of bread are being forwarded through the slicing unit at a faster rate than can be carried away by the wrapping mechanism; and means for actuating said control device when more loaves of bread are being fed through the slicing unit than can be taken up by the wrapping mechanism.

12. In a loaf feed control of the class described, in which an infeed mechanism forwards loaves of bread to be sliced to and through a bread slicing unit, an outbound transfer mechanism disposed on the opposite side of said slicing unit and normally actuated in time with a wrapping mechanism for transferring sliced loaves from the slicing unit to the wrapping mechanism; a single speed motor for driving said infeed conveyor; an electrical control circuit controlling the operation of said single speed motors; and means disposed at the outbound side of the slicer unit for breaking said circuit when more loaves of bread are fed through the slicer unit than are taken away by the wrapping machine.

13. An apparatus of the class described including in combination a slicing machine comprising slicing knives, means for feeding articles to the slicing knives, driving means for said feeding means including an electric motor, means for energizing said electric motor, a transfer adapted to receive sliced articles from said knives and to deliver the sliced articles to an infeed portion of a wrapping machine, and means disposed at the delivery end of the slicing knives in the path of movement of the sliced articles and operable by contact with said sliced articles for controlling the operation of the motor energizing means.

14. An apparatus of the class described including in combination a slicing machine comprising slicing knives, means for feeding articles to the slicing knives, driving means for said feeding means including a multispeed electric motor, transfer means disposed at the delivery end of the knives to receive the sliced articles and to transfer them to the infeed portion of a wrapping machine, and means acted upon when there is an overfeed of sliced articles for changing the speed of said motor to reduce the overfeed.

15. The combination with a slicing machine, of a transfer mechanism comprising, a support, an arm having a pusher plate mounted on the end thereof, means for oscillating said arm, means for rendering said oscillating means inoperative until a sliced loaf has been deposited upon said support, and mechanism for operating said pusher plate to move it in a closed path to and from starting position; said mechanism including means for holding said pusher plate above the support when transferring an article, means for lowering said pusher plate below the support in a substantially vertical path parallel to the face of the loaf engaged by the pusher to thereby avoid pinching the loaf, and means to permit the plate to be returned below the support to starting position.

16. In a bread slicing machine, a loaf transfer mechanism comprising, a pusher having a substantially flat pushing face, means for bringing said pusher into contact with a loaf and forwarding the loaf along a predetermined path of travel to a predetermined station, and means for removing the flat pushing face from contact with said loaf along a path substantially parallel with the side of the loaf being pushed to avoid deformation of the loaf.

17. In a bread slicing machine, a transfer mechanism comprising, a support, a pusher member having a substantially flat face, means for raising said pushing face above said support, means for bringing said pushing face into contact with the side of a loaf to advance the same over said support, means for withdrawing the face of said pusher below said support along a path parallel with the side of the loaf to avoid disrupting the same, and means for returning said pusher to its starting position to feed additional loaves in a smiliar manner.

THORMOD JENSEN.